United States Patent [19]

Jopson

[11] Patent Number: 5,101,291
[45] Date of Patent: Mar. 31, 1992

[54] OPTICAL FREQUENCY CONVERSION DEVICE

[75] Inventor: Robert M. Jopson, Rumson, N.J.
[73] Assignee: AT&T Bell Laboratories, Murray Hill, N.J.
[21] Appl. No.: 635,059
[22] Filed: Dec. 28, 1990
[51] Int. Cl.$^5$ .............................................. H04J 14/02
[52] U.S. Cl. .................................... 359/124; 359/128
[58] Field of Search .............. 350/358; 372/28; 370/3, 370/1; 455/609, 615, 616; 359/124, 128, 333

[56] References Cited

U.S. PATENT DOCUMENTS

| | | | |
|---|---|---|---|
| 4,586,184 | 4/1986 | Hess | 350/358 |
| 4,625,305 | 11/1986 | Epworth | 370/3 |
| 4,697,888 | 10/1987 | Schmadel, Jr. et al. | 350/358 |
| 4,989,201 | 1/1991 | Glance | 370/3 |

OTHER PUBLICATIONS

Midwinter, J. E., Photonic Switching Proceedings of the 1st Topical Meeting, Mar. 18-20, 1987, pp. 14-23.
P. Coppin et al., Electronics Letters, vol. 26, No. 1, Jan. 4, 1990, "Novel Optical Frequency Comb Synthesis . . . ", pp. 28-30.
T. Hodgkinson et al., Electronics Letters, vol. 26, No. 1, Aug. 2, 1990, "Optical Domain Frequency Translation of a . . . ", pp. 1262-1264.
T. Hodgkinson et al., Electronics Letters, vol. 25, No. 8, Apr. 13, 1989, "Comparison of Sinusoidal and Pulse Modulation . . . ", pp. 509-510.
W. A. Stallard et al., Br. Telecom Technol J., vol. 4, No. 4, Oct. 1986, "Electro-Optic Frequency Translators and Their Applications . . . ", pp. 16-22.

Primary Examiner—Edward L. Coles, Sr.
Assistant Examiner—Kinfe-Michael Negash
Attorney, Agent, or Firm—Gregory C. Ranieri

[57] ABSTRACT

An optical apparatus for generating an optical frequency comb from an optical input signal is realized by transmitting the optical signal through an optical circuit comprising an optical amplifier and a Bragg cell configured in an optical cavity. By aligning the cavity such that the incident light is deflected by the Bragg cell and recirculated therein, on each pass within the cavity the incident light is frequency shifted by a predetermined frequency, producing a comb of optical frequencies, each a time-delayed replica of the incident light. Importantly, the optical amplifier positioned within the cavity substantially compensates for any cavity loss, enhancing the output uniformity of each generated carrier.

25 Claims, 5 Drawing Sheets

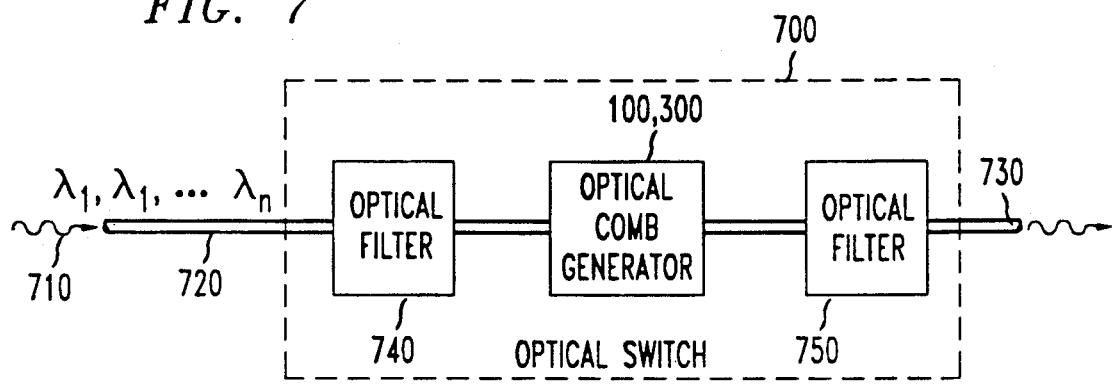
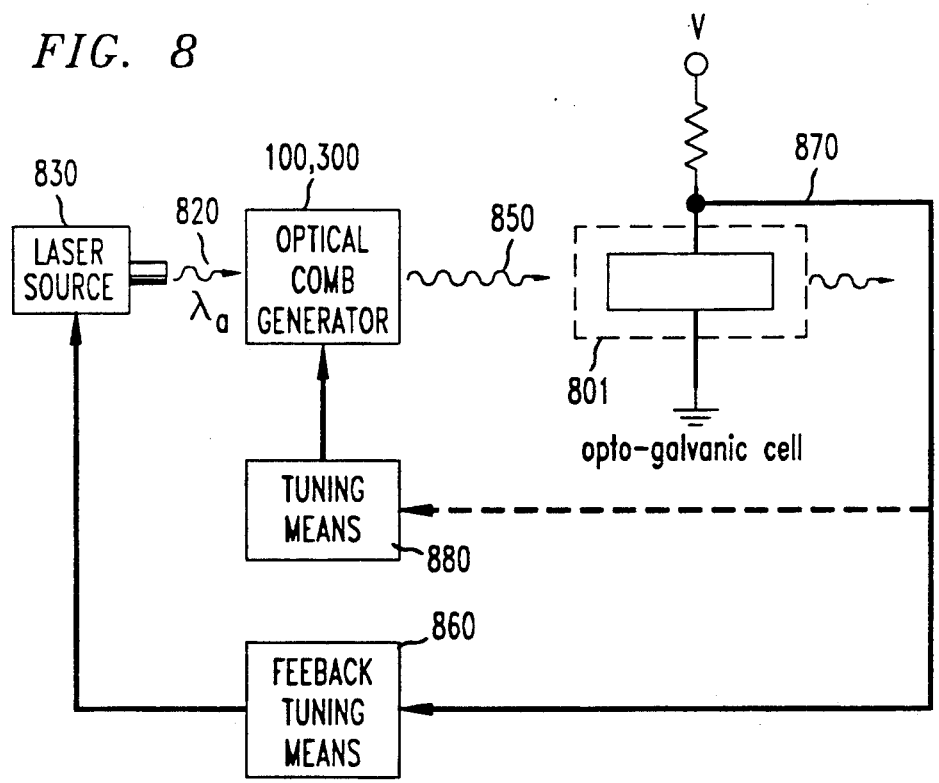

OPTICAL FREQUENCY CONVERSION DEVICE

TECHNICAL FIELD

The present invention relates generally to optical frequency translators, and, more particularly, to an optical frequency translator for generating an optical frequency comb.

BACKGROUND OF THE INVENTION

Optical frequency-division multiplexed (FDM) transmission systems as well as certain optical heterodyne processing functions desirably require the effective comb generation of optical frequencies from a single optical source. By generating optical signals each with a carefully defined frequency and offset, it is possible to transmit over a single-mode fiber a number of closely-spaced channels in order to exploit the fiber's enormous bandwidth potential. See, for example, K. Nosu et al., *Journal of Lightwave Technology*, Vol. LT-5, No. 9 pp. 1301-8(1987). Additionally, optical heterodyne detection, which is useful for selecting a signal among many distributed optical signals or many narrowly-spaced optically multiplexed signals, requires that the optical carrier wave frequency deviation be controlled to within approximately ten percent of the signal clock frequency. As such, it is extremely advantageous for the respective optical signals, which are offset by a definite frequency, to be synthesized from a single common optical source or "seed" so as to obviate the need for complex frequency stablization techniques.

In the prior art, various techniques have been proposed for generating an optical frequency comb, that is, a periodic set of optical signals having a fixed frequency offset. Such techniques have either been based on combining the output from many different optical frequency sources or modulating a single laser source vis-a-vis Mach-Zehnder based electro-optic frequency translators in order to produce a plurality of modulation sidebands. See W. A. Stallard et al., *British Telecom Technology Journal*, Vol. 4, No. 4 pp. 16-22(1986). Typically in Mach-Zehnder based translators, an optical frequency comb is generated by sinusoidally modulating an interferometer consisting of two Y-junction waveguide structures connected by LiNbO$_3$ phase modulators. Splitting the incident optical signal into two paths with a phase modulation therebetween produces at the recombined Y-junction output optical signals that are generated at integer multiple frequencies of the incident light.

Although the prior art optical frequency comb generators perform acceptably, it is highly desirable not only to increase the intensity uniformity of the light at the translated frequencies, but also to provide a greater degree of flexibility and control in the characteristics of the optical frequency comb.

SUMMARY OF THE INVENTION

An optical apparatus for generating an optical frequency comb from an input optical signal is realized by transmitting the input optical signal through an optical circuit comprising an optical amplifier and a Bragg cell configured in a cavity, such as a recirculating loop. By aligning the cavity such that incident light is diffracted by the Bragg cell and recirculated therein, on each pass within the cavity the incident light is frequency shifted by a predetermined frequency, producing a comb of optical frequencies, each a time-delayed replica of the incident light. Importantly, the optical amplifier positioned within the cavity substantially compensates for any cavity loss, enhancing the output unformity of each frequency shifted carrier within the optical comb.

In one embodiment of the invention, an optical gain medium enclosed between anti-reflective and partially reflective end facets, thereby forming an optical amplifier, is aligned with a Bragg cell in an optical cavity that is externally coupled to an external cavity laser. By adjusting the acoustic frequency that drives the Bragg cell, a plurality of optical signals, equally spaced by twice the acoustic frequency, is generated at one end facet of the cavity.

BRIEF DESCRIPTION OF THE DRAWING

A more complete understanding of the invention may be obtained by reading the following description in conjunction with the appended drawing in which:

FIG. 7 is schematic diagram of the present invention being utilized as a simple photonic switch; and FIG. 8 is schematic diagram of the present invention being utilized as a means for locking to or measuring the frequency of an unknown optical signal.

DETAILED DESCRIPTION

Figure 1:
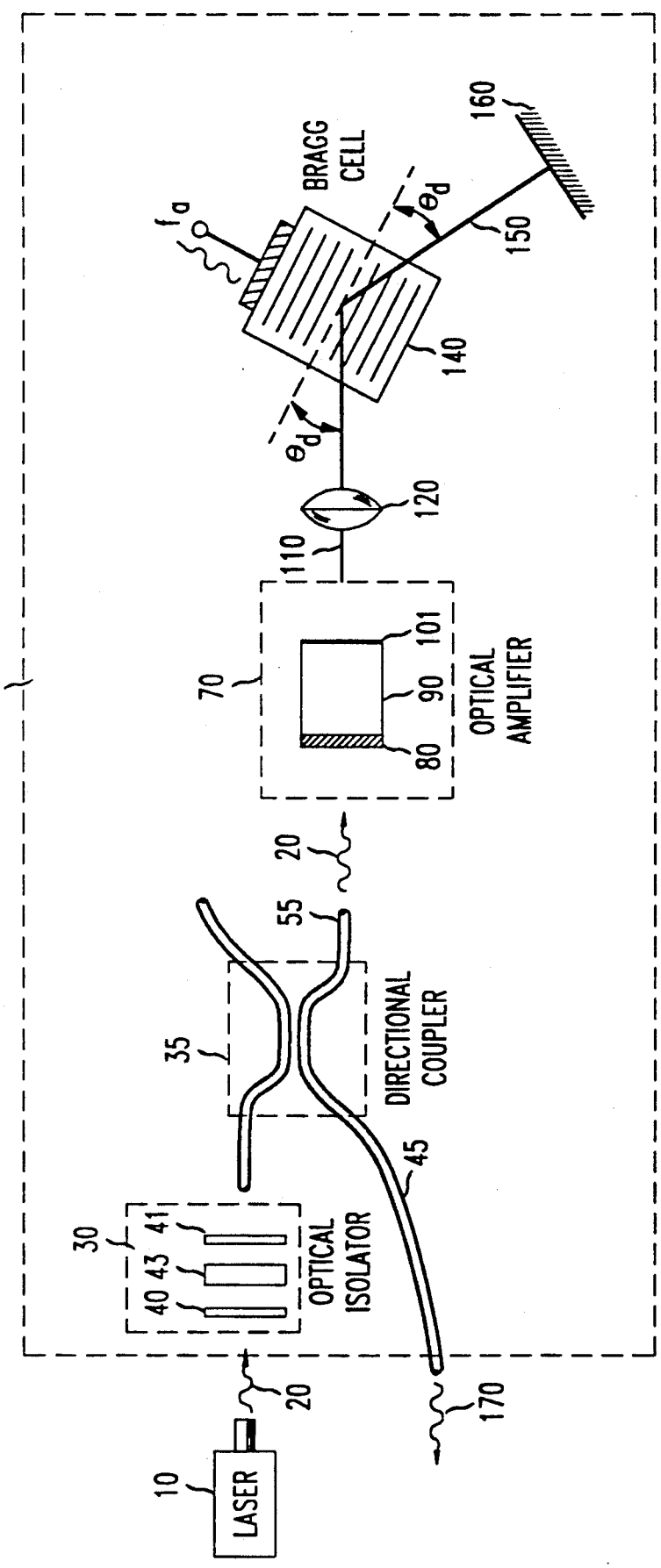
FIG. 1 is a schematic block diagram of an optical frequency comb generator in accordance with the principles of the invention.

As shown in FIG. 1, the present invention is an optical apparatus for generating an optical frequency comb from a single wavelength input optical source. It is based upon the discovery that transmitting an optical signal through an optical circuit comprising an optical amplifier and Bragg cell configured in a recirculating loop, such as a linear or loop cavity, will generate a plurality of optical carriers offset by the frequency of the acoustic wave that drives the Bragg cell for the case of a loop cavity or twice that frequency for the case of a linear cavity. Importantly, each generated optical carrier is a time-delayed duplicate of the incident optical signal, except for the frequency offset. Hence, these frequency shifted replicas contain any amplitude or phase modulation that exists on the incident optical signal.

Figure 2:
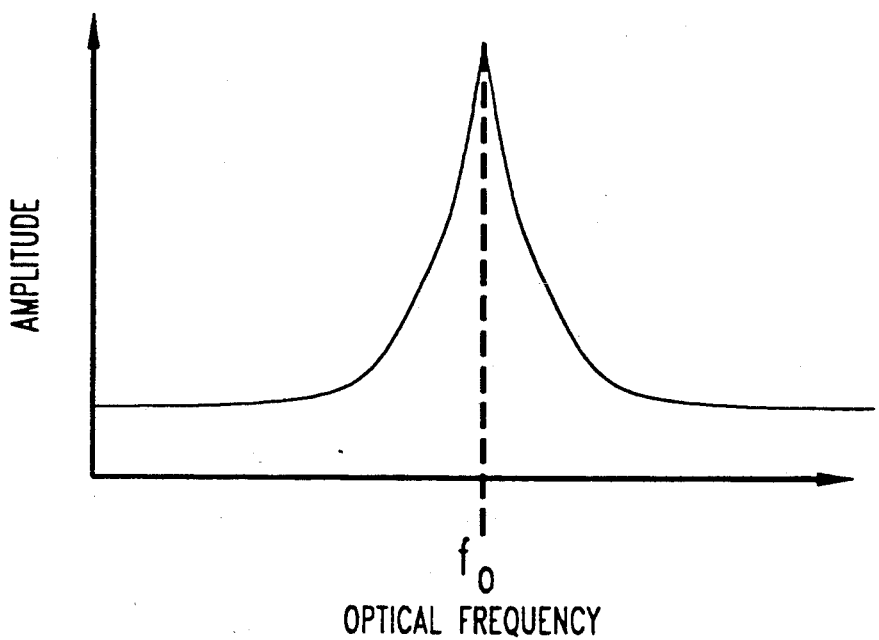
FIG. 2 is a graph of the spectral mode amplitude versus frequency profile of the source laser in FIG. 1.

In accordance with the principles of the invention, optical output 20 from laser source 10 propagates through optical amplifier 70 and Bragg cell 140, thereby generating an optical frequency comb 170 upon traversing the optical cavity between reflector 80 and 160 repeatedly. In laser source 10, the spectrum of optical signal 20 generated typically consists of a single spectral mode $f_o$ as illustrated in FIG. 2. In some instances, however, optical signal 20 may contain modulation sidebands if the optical signal has previously been modulated. Optical signal 20 generated from source laser 10 propagates through optical isolator 30 consisting, for example, of two polarizers 40 and 41, with Faraday rotator 43 disposed therebetween. Optical isolators are well known to those skilled in art and, hence, will not be discussed here. Optical coupler 35 couples optical signal 20 into optical fiber 55 in addition to coupling optical frequency comb 170 to an output port of optical fiber 45, thereby permitting simultaneously ingress and egress of optical signal 20 and optical frequency comb 170, respectively. Furthermore, optical isolator 30 prevents the optical frequency comb from returning to source laser 10.

As indicated in FIG. 1, partial reflector 80 and antireflecting coating 101 in combination with optical gain medium 90 are arranged to form optical amplifier 70. Optical amplifiers are well known in the prior art, such as semiconductor optical amplifiers, Erbium-doped fiber amplifiers, and, thus, are not discussed in detail here. However, for a detail discussion on the operation of optical amplifiers, see for example, T. Mukai et al., *Optical Amplification By Semiconductor Lasers*, Semiconductor and Semimetals, Vol. 22, ed. by W. T. Tsang, Part E, pp. 265-319(Academic, Orlando 1985); G. Eisenstein et al., International *Journal of Electronics*, Vol. 60, pp. 113-21(1986); and E. Desurvire et al., *Optics Letters*, Vol. 12, pp. 888-90 (1987). Optical signal 110 from the output of optical amplifier 70 propagates through lens 120 which collimates the divergence of optical signal 110 to match the entrance aperture of Bragg cell 140.

Optical signal 110 is not only defected at an angle $2\theta_d$ by Bragg cell 140, but more importantly frequency shifted by an amount $f_a$ corresponding to the acoustic frequency of the sound wave traversing Bragg cell 140. Those skilled in the art will readily note that Bragg cell 140 operates on the well-known principle that light incident on a sound wave, which consists of sinusoidal perturbation of the density of the propagating medium traveling at a sound velocity of v and acoustic frequency $f_a$, causes a change in the index of refraction that leads to the incident beam being diffracted at an angle $2\theta_d$ with an optical frequency offset of $f_a$. The diffracted angle $\theta_d$ can be mathematically be expressed as follows:

$$\theta_d = \sin^{-1}\left(\frac{\lambda f_a}{2nv}\right)$$

where $\lambda$ is the vacuum wavelength of the incident light and n is the refractive index of the Bragg cell material. Accordingly, the acoustic frequency $f_a$ of the sound wave traveling across the Bragg cell may be adjusted so that optical signal 110 is frequency shifted by the desired amount. It should be noted that the wavelength $\lambda$ is related to the optical frequency $v$ by the following relationship: $\lambda = c/\lambda$. Hence, reference made to frequency is to be understood to encompass a reference in the alternative to wavelength via the relationship above.

Figure 3:
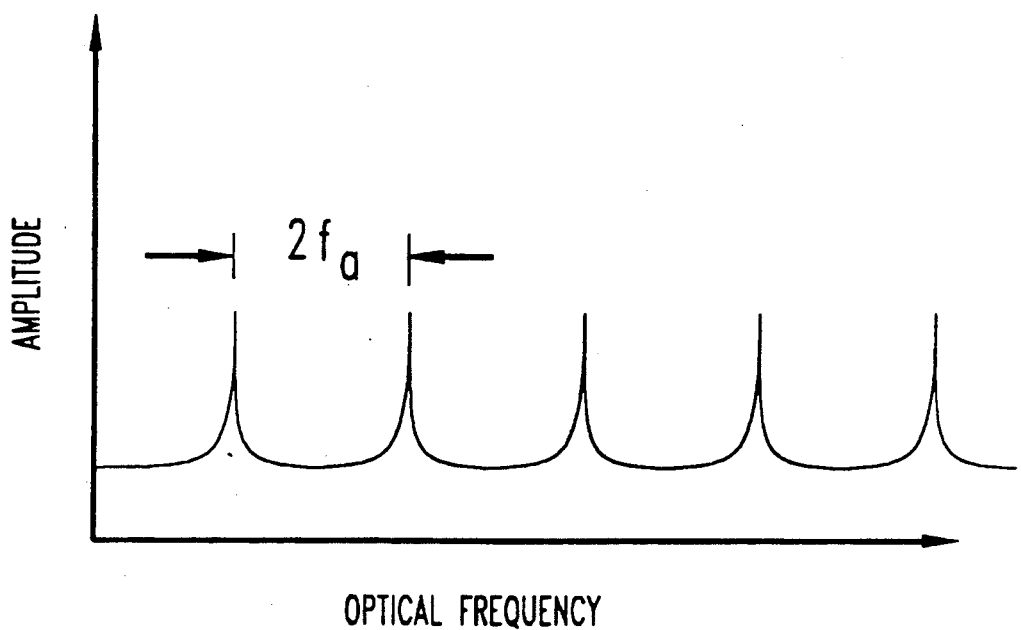
FIG. 3 is the graph of the spectral mode amplitude versus frequency profile of the typical optical frequency comb output from the anti-reflective end facet of the optical amplifier shown in FIG. 1.

The frequency shifted optical signal 150 is transmitted by Bragg cell 140 and reflected back thereto by mirror 160. Upon reflection, it is deflected and frequency shifted once more by Bragg cell 140 and transmitted back to optical amplifier 70. Importantly, an optical cavity, here a linear cavity, is thereby formed by optical amplifier 70, Bragg cell 140 and mirror 160. With each pass within the optical loop cavity, the optical beam therein is shifted by the amount of twice the acousto-optic frequency driving Bragg cell 140. If the gain of optical amplifier 70 is adjusted so as to substantially compensate for any cavity loss, optical frequency comb 170 is produced having a frequency spacing of $2f_a$, as illustrated in FIG. 3. Furthermore, it should be noted that each carrier or channel of optical frequency comb 170 is an exact replica of incident optical signal 20, but delayed by an amount T, where T is the round trip time of the cavity.

Figure 4:
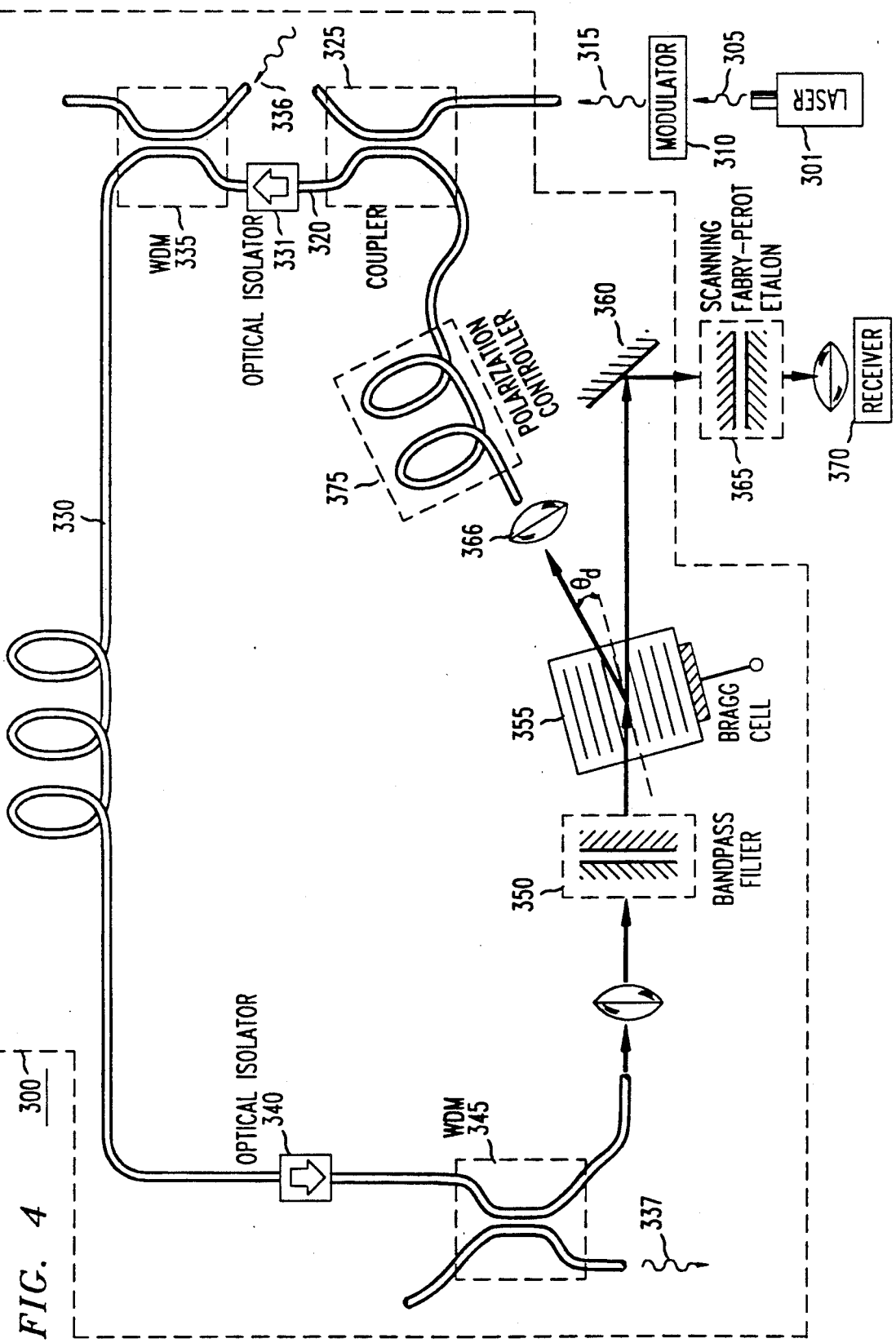
FIG. 4 is a schematic block diagram of the inventive optical frequency comb generator configured in ring cavity geometry, utilizing an Erbium-doped optical amplifier.

The specific embodiment in accordance with the principles of the invention which was constructed to practice the present invention is illustrated in FIG. 4. This embodiment utilizes a ring cavity geometry containing both an optical amplification and frequency translation means. The output from the laser source is coupled into the loop cavity such that with each transit the frequency thereof is frequency shifted by an amount corresponding to the acousto-optic frequency driving the Bragg cell, commonly known as the "Bragg frequency", and hence generates an optical frequency comb.

Referring to FIG. 4, an external cavity laser ($\lambda = 1.532$ μm) is used as laser source 301, with electro-optic modulator 310 modulating optical signal 305 with a 13 Megabit/s pseudo-random sequence. In general, it is contemplated that the laser source have a linewidth smaller than the operating frequency of Bragg cell 355. Importantly, the incident optical signal may be from remote lasers, such as from an optical communication network. In this ring cavity geometry, modulated optical signal 315 is optically coupled into optical fiber 320 by directional coupler 325 and passes through optical isolator 331 into Erbium-doped fiber 330. Optical isolator 331 prevents any unwanted feedback or back reflection into laser 301 and also prevents unwanted feedback into wavelength division multiplexer (WDM) 335. With wavelength division multiplexer (WDM) 335 injecting pump light 336 at a wavelength near 1.480 μm, Erbium-doped fiber 330 may be utilized as an optical amplifier for compensating the attenuation that results from optical loss within the ring cavity configuration. Optical isolator 340 further provides isolation within the optical cavity, with wavelength division multiplexer (WDM) 345 further affording egress for excess pumping light 337.

It should be noted that the number of carriers or frequency-shifted signals generated in any particular cavity is ultimately limited by the gain-bandwidth thereof divided by the frequency spacing of the carriers. In principle, the gain-bandwidth of the cavity may be determined implicitly by the gain-bandwidths of the optical amplifier and the other optical components therein. However, the gain-bandwidth can be expressly set by placing an optical band-pass filter, such as Fabry-Perot etalon filter 350 within the cavity ring. It should be noted that the saturation power of the Erbium-doped fiber amplifier and, in general, any optical amplifier, will determine the maximum desired spectral width of band-pass filter 350 because the number of channels or carriers times the power in each channel should not exceed the desired level of saturation of the optical amplifier.

A 200 MHz Bragg cell 355 operating at a RF power level of 1 Watt is used within the optical cavity to frequency translate the modulated signal from laser 301 in accordance with principles discussed aboveherein. While the material used for Bragg cell 355 is Tellurium Dioxide (TeO$_2$), other materials may be used. Apposite to the choice of material is the signal wavelength and the bit rate desired. For example, LiNbO$_3$ is well suited for moderate speeds. However, for multi-gigabit/s applications, Indium Phosphide (InP) may be the material of choice. Additionally, while the operating frequency of the Bragg cell can be as high as several gigahertz, its lower operating frequency is limited by the requirement that the round-trip cavity frequency shift be greater than the bit rate of the incident optical signal.

The generated optical frequency comb in the cavity that is not frequency translated or diffracted, is redirected by mirror 360 into a scanning Fabry-Perot etalon 365 and photoreceiver 370 for detecting the optical frequency spectrum of the generated optical frequency comb or for measuring bit-error rates. It should be noted that with each transit around the ring cavity, prior frequency translated signals are coupled back into the ring cavity by lens 366 and polarization controller 375. Generally, some optical components within the cavity are partially polarization sensitive and, thus, polarization controller 375 is needed therein to ensure that each frequency translated carrier or channel sees the same optical gain. Those skilled in the art will note that intracavity polarization controller 375 is adjusted so that the polarization of the input optical signal enters the cavity in a polarization eigenstate of the cavity. Additionally, all components should be designed to eliminate the coupling of reflections into the cavity.

For large frequency shifts and a large number of carriers generated, the difference in diffracted angle $\theta_d$ between the first and last carrier generated may be appreciable because the diffracted angle varies with wavelength, resulting in "walk-off". It is contemplated that by utilizing a second Bragg cell (not shown) this "walk-off" problem can be partially mitigated by deflecting the carrier by an equal but opposite angle to the initial deflection. As such, light egressing from the second Bragg cell is emitted in a direction parallel to the direction from which the light originally enter the first Bragg cell, regardless of the wavelength of the incident light.

Figure 5:
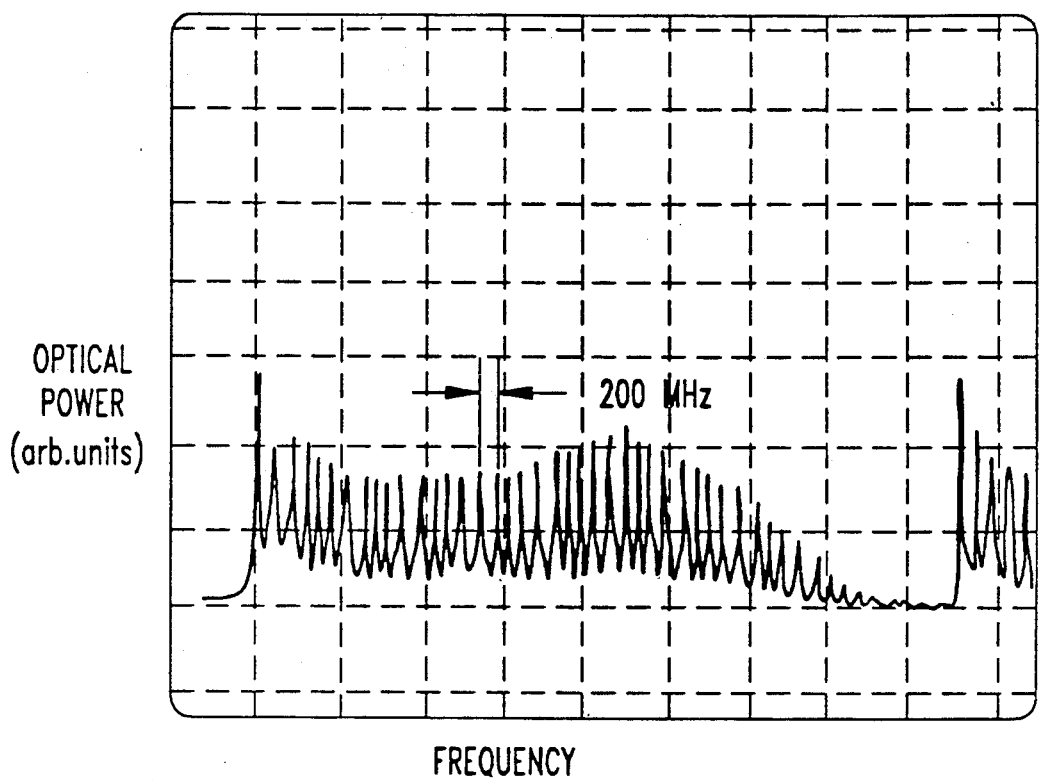
FIG. 5 shows the optical frequency comb spectra generated by the optical frequency comb generator illustrated in FIG. 4.
Figure 6:
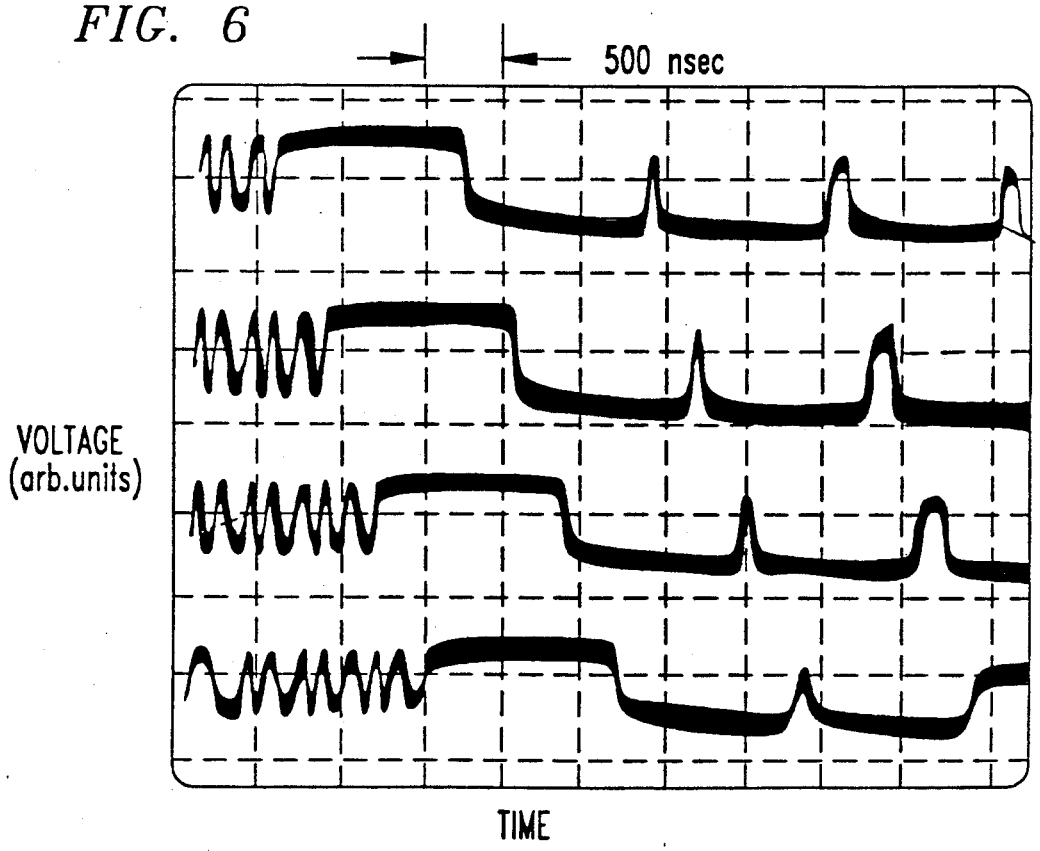
FIG. 6 shows the intensity versus time profile for four adjacent channels generated by the optical frequency comb generator illustrated in FIG. 4.

Illustrated in FIG. 5 is the optical frequency comb spectra generated as displayed by scanning Fabry-Perot etalon 365. It should be noted that more than 40 carriers, each separated by 200 MHz, were generated from a single optical signal, with the observed comb spectrum expressly band limited by band-pass filter 350. Importantly, each generated optical carrier is a time delayed duplicate of modulated optical signal 315. Hence, these frequency shifted replicas contain any amplitude or phase modulation that exists on the incident optical signal. With the incident optical signal amplitude modulated by a 13 Megabit/s NRZ pseudo-random bit sequence via modulator 310, four adjacent channels of the generated optical comb shown in FIG. 5 are displayed in FIG. 6. In particular, it should be noted that each channel, spectrally spaced by 200 MHz, contains the modulated pseudo-random sequence imposed on the incident optical signal, but shifted in time from the previous channel by a time of about 300 nsec, corresponding to the optical round trip time of the cavity. It is contemplated that beat frequencies between carriers will not be problematic if the optical amplifier is operated well below the saturation power or if the carrier separation is greater than the reciprocal of the upper state lifetime associated with the amplifier. While in semiconductor amplifiers, this limits the carrier separation to greater than 300 MHz, for Erbium-doped amplifiers the separation is limited to be greater than 80 Hz.

To better understand the operation of the inventive optical frequency comb generator, it is interesting to note the effects of various physical phenomena, such as amplifier spontaneous noise and gain saturation. The power spectrum of the spontaneous noise emission depends on the spectral shape of the cavity gain, but will generally be low at one edge of the cavity gain bandwidth and high at the other end. If the Bragg cell is configured to up-convert the incident optical signal, then the higher frequency side of the cavity gain bandwidth will have a higher noise spectral while the reverse will be true if the Bragg cell down-converts the optical frequency. While amplifier noise can be problematic since it degrades the quality of signals propagating within the cavity, the effects of the noise can be minimized by properly selecting the bandwidth and band center of intracavity band-pass filter 350. Disadvantageously, however, limiting the bandwidth restricts the number of carrier generated.

Additionally, it should be noted that the signal-to-noise ratio in the signal carriers can be improved by reducing the loss within the cavity. For example, assuming that the total output power of the comb of modulated carriers is limited by the amplifier saturation power, a cavity with lower loss will have a higher signal-to-noise ratio since the equivalent input noise spectral density of the amplifier is nominally independent of the amplifier gain. Hence, a cavity with lower loss will require less gain and therefore will emit less noise at the output.

It is contemplated that with a sufficiently large gain bandwidth, the optical gain will be limited by saturation from the total optical power propagating through the amplifier. Interesting though, such amplifier saturation is not necessarily deleterious to the operation of optical frequency comb generator 300. For example, it might be the desirable mode of operation because its tends to provide self-regulation of the cavity.

It is anticipated that the present optical frequency comb generator 100,300 will be useful in numerous applications. For example, advantageously, the present invention in different configurations may be utilized as an elemental switching component in a photonic switch, means for frequency locking a laser to a desired frequency offset or means for precisely measuring the frequency offset of an optical signal from a reference frequency.

In the case where it is desirable to utilize optical comb generator 100,300 as a photonic switch, optical filters may be positioned at the input and output ports, as illustrated in FIG. 7. Functionally, photonic switch 700 selects a particular wavelength channel at input fiber 720 and converts it to a desired wavelength at output fiber 730. A wavelength division multiplexed optical signal 710 having optical signals at wavelength channels $\lambda_1, \lambda_2, \lambda_3, \ldots \lambda_n$ is coupled into to optical switch 700 comprising input optical filter 740, optical comb generator 100,300 and output optical filter 750. In operation, input filter 740 selects one of input channel, for example $\lambda_1$, and then optical comb generator 100,300 shifts it to a comb of new optical frequencies according to the teachings aboveherein. Subsequently, output filter 750 selects one of the generated comb frequency or carrier for output, and transmits it to a desired subscribed receiving at a wavelength of the selected comb carrier.

In a similar manner as above, the inventive optical comb generator may be utilized as a locking means to lock an optical signal to a desired wavelength which may be offset from any available reference wavelength. As illustrated in FIG. 8, the frequency locking means comprises optical comb generator 100,300 and opto-galvanic cell 801 which detects the presence of a predetermined reference wavelength. Optical signal 820 ($\lambda_a$) from laser source 830 is coupled to optical comb generator 100,300 which produces a comb of frequencies, each offset from $\lambda_a$ by an integer multiple of the operating Bragg frequency of optical comb generator 100,300. With the generated comb frequency 850 coupled to the opto-galvanic cell 801, the opto-galvanic cell indicates the presence of a known reference wavelength via electrical signal 870. It should be noted that other means for detecting a known reference wavelength may be utilized, which are well known in the art. In order to lock optical signal 820 to an offset frequency from the reference wavelength associated with opto-galvanic cell 801, the frequency of laser source 830 is tuned by using feedback tuning means 860 which is responsive to signal 870 until the desired lock frequency is achieved. Thus, optical signal 820 is now offset from the reference wavelength or frequency by an integer multiple of the Bragg frequency. The multiple integer can be determined by counting from the zero offset by sweeping the Bragg Frequency in such a manner as described in the following paragraph.

Advantageously, the apparatus of FIG. 8 can also be utilized as a means to measure the offset frequency from a reference frequency carrier $v_{ref}$ of an unknown optical frequency $v_o$ that is incident on optical comb frequency generator, if the Bragg cell is made tunable. In order to measure the frequency offset, the Bragg frequency is adjusted by tuning means 880 so that opto-galvanic cell 801 indicates the presence of a reference wavelength $\lambda_{ref}$ or frequency $v_{ref}$. Labeling the Bragg frequency $f_1$ at which the resonance or detection of a first integer multiple of the reference wavelength occurs, the Bragg frequency is decreased until a resonance is again observed by opto-galvanic cell 801 via signal 870. This second Bragg frequent is labeled $f_2$. Since these resonance are observed for adjacent offsets from the reference frequency $v_{ref}$ or reference wavelength $\lambda_{ref}$, the unknown optical frequency $v_o$ must satisfy the following relationships: $v_o = v_{ref} + mf_1$ and $v_o = v_{ref} + (m+1)f_2$, where m is an unknown integer. Solving these two equations, it can be shown that $m = f_2/(f_1 - f_2)$ and, hence, the offset of the unknown frequency from $v_{ref}$ can be determined. Since the angular deflection $\theta_d$ of the incident optical beam on the Bragg cell is nominally proportional to the Bragg frequency, this technique may require that m be a fairly large number, to avoid a "walk-off" problem.

It is contemplated that the present optical comb generator will be useful in numerous other applications, such as in optical communication systems. These applications will be readily obvious to those skilled in the art seeking a highly efficient means for generating an optical frequency comb, with or without modulation on each carrier frequency generated.

I claim:

1. An optical apparatus for generating an optical frequency comb having a plurality of optical carrier frequencies, each spaced apart from another by an offset frequency, said optical apparatus comprising:
    means for frequency translating an input optical signal having a first optical carrier frequency to an output optical signal having a second optical carrier frequency;
    means for optically amplifying said output optical signal into an amplified output optical signal; and
    means for optically recirculating a portion of said amplified output optical signal to said means for frequency translating as a recirculated input optical signal, thereby forming a recirculating loop so that with repeated transits within said loop said recirculated input optical signal is both frequency translated and optically amplified such that said optical frequency comb is generated.

2. The optical apparatus as defined in claim 1 wherein said means for optically amplifying has an optical gain substantially sufficient to compensate for optical loss in said recirculating loop.

3. The optical apparatus as defined in claim 2 further comprising
    means for coupling optically said input optical signal to said means for frequency translating.

4. The optical apparatus as defined in claim 3 further comprising
    output means for coupling optically said optical frequency comb said recirculating loop.

5. The optical apparatus as defined in claim 4 wherein said means for frequency translating includes a Bragg cell operating at an acoustic wave frequency $f_a$.

6. The optical apparatus as defined in claim 5 wherein said Bragg cell includes $TeO_2$.

7. The optical apparatus as defined in claim 5 wherein said Bragg cell includes $LiNbO_3$.

8. The optical apparatus as defined in claim 5 wherein said Bragg cell includes InP.

9. The optical apparatus as defined in claim 5 wherein said means for optically recirculating includes a linear optical cavity.

10. The optical apparatus as defined in claim 9 wherein said offset frequency is twice said acoustic wave frequency.

11. The optical apparatus as defined in claim 5 wherein said means for optically recirculating includes a loop optical cavity.

12. The optical apparatus as defined in claim 11 wherein said offset frequency is said acoustic wave frequency.

13. The optical apparatus as defined in claim 5 wherein said means for optically amplifying includes a semiconductor optical amplifier.

14. The optical apparatus as defined in claim 5 wherein said means for optically amplifying includes an Erbium-doped fiber optical amplifier.

15. The optical apparatus as defined in claim 13 further comprising
    means coupled optically to the input optical signal coupling means for optically modulating said input optical signal.

16. The optical apparatus as defined in claim 15 wherein said means for optically modulating includes an electro-optic modulator.

17. The optical apparatus as defined in claim 16 further comprising means for filtering a predetermined spectral region of said input optical signal for limiting the gain-bandwidth of said recirculating loop.

18. The optical apparatus as defined in claim 17 wherein said means for filtering includes a Fabry-Perot etalon.

19. A photonic switch for converting the optical carrier frequency of an input optical signal to a different predetermined optical carrier frequency, said photonic switch comprising:
   first means for selecting said input optical signal from among wavelength division multiplexed optical signals;
   means for frequency translating said input optical signal having a first optical carrier frequency to an output optical signal having a second optical carrier frequency;
   means for optically amplifying said output optical signal into an amplified output optical signal;
   means for optically recirculating a portion of said amplified output optical signal to said means for frequency translating as a recirculated input optical signal, thereby forming a recirculating loop so that with repeated transits within said loop said recirculated input optical signal is both frequency translated and optically amplified such that an optical frequency comb is generated, said optical frequency comb having a plurality of optical carrier frequencies, each spaced by an offset frequency; and
   second means for selecting one of said plurality of optical carrier frequencies corresponding to said different predetermined optical carrier frequency.

20. The photonic switch as defined in claim 19 wherein said first means for selecting said input optical signal includes a Fabry-Perot etalon.

21. The photonic switch as defined in claim 20 wherein said second means for selecting one of said plurality of optical carrier frequencies includes a Fabry-Perot etalon.

22. An optical apparatus for locking the carrier frequency of an input optical signal generated by an optical signal source to a predetermined optical carrier frequency, said predetermined carrier frequency offset from an reference optical frequency by an integer multiple, said optical apparatus comprising;
   means for frequency translating said input optical signal having a first optical carrier frequency to an output optical signal having a second optical carrier frequency;
   means for optically amplifying said output optical signal into an amplified output optical signal;
   means for optically recirculating a portion of said amplified output optical signal to said means for frequency translating as a recirculated input optical signal, thereby forming a recirculating loop so that with repeated transits within said loop said recirculated input optical signal is both frequency translated and optically amplified such that an optical frequency comb is generated, said optical frequency comb having a plurality of optical carrier frequencies, each spaced from each other by an offset frequency;
   means coupled to said optical signal source for varying the optical carrier frequency of said optical signal in response to a control signal; and
   means responsive to the presence of said reference optical frequency for generating said control signal for said means for varying the optical carrier frequency to lock said optical signal source to an integer multiple of said reference optical frequency.

23. The optical apparatus as defined in claim 22 wherein said means responsive to the presence of said reference optical frequency includes an optogalvanic cell.

24. An optical apparatus for measuring the offset frequency from a reference optical frequency $V_{ref}$ of an input optical signal having a first optical carrier frequency $v_o$, said optical apparatus comprising;
   means for frequency translating said input optical signal having said first optical carrier frequency to an output optical signal having a second optical carrier frequency;
   means for optically amplifying said output optical signal into an amplified output optical signal;
   means for optically recirculating a portion of said amplified output optical signal to said means for frequency translating as a recirculated input optical signal, thereby forming a recirculating loop so that with repeated transits within said loop said recirculated input optical signal is both frequency translated and optically amplified such that an optical frequency comb is generated, said optical frequency comb having a plurality of optical carrier frequencies, each spaced from another by a tunable offset frequency;
   means, coupled to said means for frequency translating, for varying said tunable offset frequency to $f_1$ and $f_2$ in response to first and second control signals, respectively; and
   means, responsive to the presence of said reference optical frequency, $V_{ref}$ for generating said first and second control signals, said first control signal corresponding to the optical carrier frequency of said input optical signal being offset by an amount $mf_1$ from said reference optical frequency, where m is an integer, and said second control signal corresponding to the optical carrier frequency of said input optical signal being offset by an amount $(m+1)f_2$ from said reference optical frequency, wherein by solving for m said offset frequency can be determined.

25. The optical apparatus as defined in claim 24 wherein said means responsive to the presence of said reference optical frequency includes an optogalvanic cell.

* * * * *